United States Patent [19]

Minami et al.

[11] 3,930,029
[45] Dec. 30, 1975

[54] METHOD OF MANUFACTURING QUICK-SOLUBLE GELATINIZED POWDERED GRAIN

[75] Inventors: Junichi Minami, Tondabaya; Mitsumune Takatsu, Kusatsu; Masaki Terada, Osaka; Tsuneo Takeuchi, Osaka; Yutaka Takagi, Osaka, all of Japan

[73] Assignee: Nissin Shokuhin Kaisha, Ltd., Japan

[22] Filed: Mar. 11, 1974

[21] Appl. No.: 450,243

[52] U.S. Cl. .................. 426/44; 426/48; 426/438
[51] Int. Cl.² .......................................... A21D 8/04
[58] Field of Search ....... 426/44, 18, 145, 148, 347, 426/438, 203, 48

[56] References Cited
UNITED STATES PATENTS

| | | |
|---|---|---|
| 2,853,388 | 9/1958 | Kiely et al............................ 426/18 |
| 3,157,513 | 11/1964 | Allen et al. ........................... 426/18 |
| 3,243,301 | 3/1966 | Hesseltive et al..................... 426/18 |
| 3,486,904 | 12/1969 | Ziegler............................ 426/347 X |
| 3,539,356 | 11/1970 | Benson et al. ...................... 426/347 |

Primary Examiner—Raymond N. Jones
Attorney, Agent, or Firm—Wenderoth, Lind & Ponack

[57] ABSTRACT

Novel quick-soluble gelatinized powdered grain is produced by a process comprising the steps of: forming a paste by adding to a powdered grain an aqueous solution a proteolytic enzyme composition containing amylase and protease and common salt; mixing and kneading said paste; forming said paste into a desired shape, frying said shaped paste to effect dehydration thereof and then comminuting the resultant product.

3 Claims, No Drawings

METHOD OF MANUFACTURING QUICK-SOLUBLE GELATINIZED POWDERED GRAIN

The present invention relates to a method for manufacturing a quick-soluble, gelatinized starch for use in potages, stews, curries, etc. capable of being prepared by merely pouring into boiling water.

Recently, the diversification in dietary habits have brought about increased prevalence of instant soups such as potages, stews, curries, etc.

Although along with such trend, research has been extensively made with regard to the speed of preparation of such soups, almost of them require several minutes' boiling. There have not been improvised delicious soups capable of being consumed by merely pouring into boiling water.

In the product manufactured in the conventional manner, there are disadvantages in that the addition of boiling water prevents uniform dispersion due to partial gelatinization which gives rise to lumps of small grain size. Moreover, instant soups lack the appropriate viscosity inherent in conventional soups so that they impart a rough sensation to the tongue, causing significant flavor degradation.

The present invention has been completed after considerable research was performed in order to remove these disadvantages.

According to the present invention, water containing dissolved proteolytic enzyme compositions including amylase and protease and common salt or sodium chloride, is added to powdered grain such as wheat flour and rice and white potato starch and the mixture is mixed at a given temperature to effect zymolysis.

Suitable enzyme compositions include those which are commonly employed for the production of gelatinized flour, e.g. "Thermoase", an enzyme preparation derived from a strain of *Bacillus stearo thermophermophilus*, also known as *Bacillus thermoproteolytics Rokko*. Thermoase is a product of Daiwa Kasei Co., Ltd., Osaka, Japan.

Suitable enzymes include those listed in the following Table.

Even if powdered grain is gelatinized and finely comminuted by mechanical means, the mere addition of boiling water cannot eliminate the rough sensation imparted to the tongue.

However, as described above, the control of time of dissolution and reaction of starch and protein by amylase and protease cannot only eliminate the rough sensation but also adjust viscosity to some extent.

The product, with the addition of common salt, compared with no salt, imparts a smooth sensation to the tongue and aids in recovery and dispersion as well. Such trend, when over 2% of salt is added, is especially significant.

The formation of a thin strip is substantially the most efficient means to secure uniform dehydration in a short time during frying by fatty oils and fats. This rapid dehydration causes swollen particles of powdered starch to become porous so that they can be easily shattered.

Fatty oils and fats freed of water during drying, prevent caking and formation of small grains when the product is added to boiling water and in addition functions effectively to improve dispersion.

EXAMPLE I

One kg. of soft wheat flour is put into a heat retaining mixer, to which is gradually added water in which 50 g. of common salt and 2 g. of enzyme preparation (Thermoase, Daiwa Kasei Ltd., Japan) is dissolved. This mixture is mixed for 20 minutes while maintaining a temperature of 30°C and is then rolled into strips with 1 to 2 mm of thickness. The thus formed strips are steamed and boiled by a steaming device for one minute.

The steamed strips are fried by fatty oils and fats heated at 140° to 145°C to dehydrate them and are then comminuted to approximately 100 mesh.

EXAMPLE II

One kg. of powdered rice is put into the heat retaining mixer to which is added 350 g. of water in which 30 g. of common salt and 2 g of enzyme preparations are dissolved. This is mixed for fifteen minutes while maintaining a temperature of 30° to 35°C, after which it is

TABLE 1

| Commericial Name | Origin (Microorganism) | Maker |
| --- | --- | --- |
| Thermoase | Bacillus thermoproteolytics | DAIWA KASEI CO., LTD. |
| Papain | Papaia | NAKARAI CHEMICAL CO., LTD. |
| Bromelain | Pineapple | NAKARAI CHEMICAL CO., LTD. |
| Bioprase | Bacillus subtilis | NAGASE SAMGYO CO., LTD. |
| Nagarse | Bacillus subtilis | NAGASE SAMGYO CO., LTD. |
| Molsin | Aspergillus saitoi | SEISHIN SEIYAKU CO., LTD. |
| KOKUrase | Aspergillus oryzae | SANKYO CO., LTD. |
| Rapidase | Trametes sangunea | TAKEDA CHEMICAL CO., LTD. |
| Pronase | Streptomyces griseus | KAKEN KAGAKU CO., LTD. |
| Proctase | Aspergillus niger | MEIJI SEIKA CO., LTD. |
| HT proteolytic | Microorganism unknown | MILES CHEMICAL CO. |

After enzyme treatment, the resultant product is then formed into a strip-like shape ready to fry. Prior to frying, it may be steamed and/or boiled. It is then fried by fatty oils or fats to dehydrate. Suitable oils or fats include palm oil, lard, cottonseed oil or other animal or vegetable oils. The resultant product is then comminuted in a conventional manner.

extruded by an extruding machine to strips of 1 mm in diameter which are then steamed and boiled for one minute, fried by fatty oils and fats heated at 150° to 155°C to dehydrate and are then comminuted to approximately 100 mesh.

In accordance with the present invention, the reaction time of the enzyme and drying time of powdered grain is far shorter than in conventional methods so that the efficiency of manufacture is significantly enhanced. Thus, the powdered grain of the present invention, with seasoning being added, if required, is easily dissolved by only the addition of boiling water so that it can provide tasty, excellent soups that taste as smooth as ones boiled for few minutes.

Furthermore, the above characteristics will be appreciated in the home as well as in volume operations such as mess halls, restaurants and collective meals, from the standpoint of economy in cooking time and personnel.

What is claimed is:

1. A method for manufacturing a quick-soluble gelatinized powdered foodstuff selected from the group consisting of wheat flour, powdered rice and white potato starch comprising the steps of forming a paste by adding to wheat flour, powdered rice or white potato starch, an aqueous solution of a proteolytic enzyme composition containing amylase and protease and sodium chloride; mixing and kneading said paste for about 15 to 20 minutes, the amount of said enzyme composition and the temperature of said mixing and kneading being sufficient to effect zymolysis; forming said paste into strips, boiling or steaming said strips and then frying said boiled or steamed strips at a temperature of up to 155°C to effect dehydration thereof and then comminuting the resultant product.

2. A method according to claim 1 wherein the frying is performed in a fatty oil, fat or mixture thereof.

3. The quick-soluble gelatinized powdered grain produced by the process of claim 1.

* * * * *